United States Patent Office 2,827,466
Patented Mar. 18, 1958

2,827,466

BIS-QUATERNARY AMMONIUM SALTS OF AMSONIC ACID

Ronald Slack, Chelsea, London, England, assignor to May & Baker Limited, Dagenham, England, a corporation of Great Britain No Drawing. Application February 4, 1954
Serial No. 408,299

Claims priority, application Great Britain
February 17, 1953

6 Claims. (Cl. 260—313)

This invention is for improvements in or relating to bis-quaternary ammonium salts of amsonic acid. It has for its object to provide a new class of compounds useful as intermediates for the preparation of various bis-quaternary ammonium salts the cation of which conforms to the general formula:

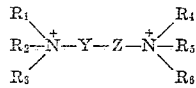

wherein $R_1$ and $R_4$ each represent the same or a different lower alkyl group, $R_2$, $R_3$, $R_5$ and $R_6$ are the same or are different and either they represent individual lower alkyl groups or the pairs $R_2$, $R_3$ and $R_5$, $R_6$ respectively form with the adjacent nitrogen atom a saturated heterocyclic group such as a pyrrolidino or morpholino group, Y represents a trimethylene or phenylene group or a divalent cyclohexane residue and Z represents an alkylene chain containing from 1 to 8 carbon atoms.

Bis-quaternary salts containing a cation of the aforesaid type are of considerable interest, many of them having already been shown to possess useful therapeutic properties (see the specifications of copending application Serial No. 259,317, now Patent No. 2,667,493; application Serial No. 326,602, now abandoned; and application Serial No. 338,618, now Patent No. 2,731,500 and Patent No. 2,661,370). However, many of such salts are readily soluble in water and their manufacture in the pure state with good yield is complicated by the difficulties experienced in the removal of soluble by-products.

It is the object of the present invention to provide new intermediates from which the above bis-quaternary ammonium salts can readily be prepared in good yield on a commercial scale. These new intermediates are salts of the foregoing type containing the anion derived from 4:4′-diamino-stilbene-2:2′-disulphonic acid (hereinafter called "amsonic acid" while its salts are hereinafter called "amsonates") and may be represented as follows:

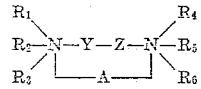

where the various variables have respectively the significance hereinbefore designated and A represents the residue of amsonic acid.

According to the present invention these new amsonates are obtained through the double-decomposition in aqueous solution of a water-soluble bis-quaternary ammonium salt of the aforesaid type by adding to that solution a water-soluble amsonate.

The new amsonates are very sparingly soluble in water at normal temperatures although they will form solutions of reasonable concentration at elevated temperatures. It is, therefore, a simple matter to isolate the new amsonates from aqueous solutions in which they are prepared. Since amsonic acid itself is substantially insoluble in water even at boiling point, the new amsonates provide a convenient and simple route to the more soluble corresponding bis-quaternary salts uncontaminated by the soluble by-products. Thus amsonic acid is precipitated by the addition of an acid to a solution or suspension of a quaternary ammonium amsonate leaving the quaternary ammonium salt corresponding to the added acid in solution in a substantially pure state. It may be isolated from the solution by methods known per se (i. e. described in the literature).

It will be appreciated that the process of the present invention can be regarded as a step in the production of bis-quaternary ammonium salts of the aforesaid types containing an anion of an acid other than amsonic acid and which are more soluble in water than the corresponding amsonate. Thus, in general, the new amsonates will be directly isolated (by precipitation) from aqueous solutions containing one of such salts (for example sulphate, nitrate, halide, sulphonate or methosulphate) by the addition thereto of a water soluble amsonate such as sodium or ammonium amsonate. The precipitated amsonate may then be purified, for example by recrystallisation from water, and converted into the desired final product by treatment with an acid containing the required anion.

The process of this invention is not only applicable to the production of known quaternary ammonium salts of the aforesaid general types as a means for eliminating otherwise necessary purification steps, but also renders possible the commercial production of hitherto unknown quaternary ammonium salts of the aforesaid general types that would be difficult to produce by the application of known methods. Examples of salts which can be conveniently prepared using the process of the present invention are the bitartrates, bisulphate, dihydrogen phosphates, adipates (neutral and acid), benzoates, chlorides, citrates, acid maleates, methosulphates, succinates (neutral and acid) and neutral sulphates.

The process of the present invention is illustrated by the following examples.

Example I

Hexamethylene 1:6-bis(trimethylammonium bromide) (3.62 g.) was dissolved in water (15 cc.) and added to a solution of pure disodium amsonate (4.14 g.) in water (10 cc.) at 50° C. Crystallisation of pale yellow hexamethonium amsonate began rapidly on cooling and was allowed to proceed at 2° C. for 12–14 hours. The crystalline material (5.34 g.) was filtered off, washed with iced water and recrystallised from water to give pure hexamethonium amsonate (4.7 g.), M. P. (decomp.) >280° C. which may, at this stage, contain water of crystallisation. A sample dried in vacuum at 100° C. over phosphorus pentoxide gave the anhydrous salt, M. P. (decomp.) 293–294° C. The solubility of the salt in water at 12° C. is approximately 0.4%.

The anhydrous amsonate (5.7 g.) prepared as described above, was dissolved in warm water (150 cc.) and the solution, at 35–40° C., was treated with d-tartaric acid (3.0 g.) in water (10 cc.). The mixture was cooled and the precipitate of amsonic acid was filtered off and washed well with cold water. The combined filtrates were evaporated to dryness. Treatment of the resulting syrup with cold alcohol gave crude hexamethonium bitartrate which was collected and dissolved in boiling methanol. The solution was again filtered from a little insoluble material and cooled to give colourless needles of the pure bitartrate, M. P. 180–182° C.

Phenyl-n-propane p-ω-bis(trimethylammonium)-amsonate was similarly prepared from the corresponding di-iodide as a pale yellow crystalline solid.

Example II

Amsonic acid (0.37 g.) was dissolved in aqueous decinormal sodium hydroxide solution (20 cc.) and hexamethylene-1:6-bis-1'-(1'-methylpyrrolidinium) - di-iodide (0.25 g.) in water (2.0 cc.) was added. Colourless plates of the sparingly soluble amsonate separated rapidly. After cooling the mixture for some hours, the substance was filtered off, washed and recrystallised from water to give the pure amsonate, M. P. (decomp.) 285–290° C. The solubility of the salt in water at 20° C. is approximately 0.13%.

*Example III*

A warm solution of the α-form of cyclohexylethane 4-ω-bis(trimethylammonium iodide) (8.4 g.), melting at 302–304° C. (decomp.) (prepared as described in co-pending application Serial No. 338,618) in water (20 cc.) was added to a warm, filtered solution of amsonic acid (8.1 g.) in a mixture of water (60 cc.) and aqueous ammonia (8 cc.; sp. gr. 0.880). The crystalline material which immediately separated was filtered off, washed with water, and dried in vacuo over silica gel. The crude amsonate (10 g.) was recrystallised from water (150 cc.) from which it separated as pale yellow needles. Drying in vacuo over silica gel, followed by exposure of the solid to the atmosphere gave a hydrate (9.6 g.) which is stable to atmospheric moisture.

This product was treated in aqueous suspension with dilute hydrochloric acid, the precipitated amsonic acid filtered off and the corresponding di-chloride obtained by concentration of the filtrate in the form of its trihydrate.

*Example IV*

Phenylethane p-ω-bis(trimethylammonium iodide) was converted, in a manner similar to that described in Example III, into the corresponding amsonate from which were obtained the dichloride dihydrate, the sulphate tetrahydrate and the bitartrate by treatment with hydrochloric and sulphuric and tartaric acid respectively.

*Example V*

5-p-dimethylaminophenyl-n-amyldimethylamine (4 g.) was heated under reflux for 48 hours with a solution of ethyl iodide (25 cc.) in ethanol (25 cc.). Removal of the ethanol and excess ethyl iodide by heating on the steam bath (finally in vacuo) gave phenyl-n-pentane p-ω-bis(dimethylethylammonium iodide) as an intractable, brown, hygroscopic gum. This was dissolved in cold water (10 cc.), shaken with charcoal and filtered. The colourless, bright solution was warmed and added to a warm filtered solution of amsonic acid (8 g.) in a mixture of water (30 cc.) and aqueous ammonia (6 cc.; sp. gr. 0.880). After being kept overnight at 0° C. the buff-coloured, felted, glistening platelets which had separated were filtered off, washed with water and dried in vacuo over silica gel. The crude amsonate (5.4 g.) was crystallised from water (150 cc.) and the light tan crystalline material thus obtained was dried as described in Example III.

The last-mentioned product was treated in aqueous suspension with tartaric acid and, after the precipitated amsonic acid had been removed by filtration, the corresponding bitartrate was obtained by concentration of the filtrate.

Phenyl-n-pentane p-ω-bis(methyldiethylammonium iodide) was similarly converted into the corresponding amsonate from which was prepared the bitartrate by treatment with tartaric acid.

*Example VI*

A warm solution of crude pentamethylene-1:5-bis(1'-methyl-pyrrolidinium bromide) (4 g.) (a colourless, deliquescent, crystalline solid prepared by refluxing 1-methylpyrrolidine with 1:5-pentamethylene dibromide in methanolic solution), in water (10 cc.) was added to a warm, filtered solution of amsonic acid (4 g.) in a mixture of water (15 cc.) and aqueous ammonia (5 cc.; sp. gr. 0.880). Pale yellow, felted, pearly platelets began to separate immediately. After being kept at 0° C. for 3 hours, the crude amsonate was filtered off, washed with water and air-dried at the laboratory temperature overnight to give a hydrated product (4.6 g.).

*Example VII*

Diethylmethylamine (574 g.) (B. P. 62–65° C.; obtained from diethylamine by formic acid/formaldehyde methylation) was added during 1 hour to a boiling solution of 1:4 dibromobutane (648 g.) (B. P. 89–90° C./20 mm.; obtained by the action of hydrobromic acid on tetrahydrofuran) in methanol (2.11 litres). After being heated for a further 18 hours, the methanol and excess diethylmethylamine were removed by distillation. The residue was diluted with water to give 4 litres of clear, almost colourless, solution of pH 6.0.

Amsonic acid (1.11 kg.) was suspended in water (4 litres), ammonia solution (450 cc.; sp. gr. 0.880) was added, and the suspension was heated to 60° C. and stirred until solution was complete. After being filtered the ammonium amsonate solution (at 60° C.) was added to the bis-quaternary bromide solution (at 60° C.) and the whole was allowed to stand overnight.

The crystalline precipitate was filtered off, washed twice with water (1 litre) and dried at 35° C. Tetramethylene-1:4-bis(diethylmethylammonium)-amsonate (1.478 kg.) was obtained as a pale, reddish-brown, sandy powder containing 5% of water.

The above product (1.386 kg.) was suspended in water (17 litres). Tartaric acid (0.66 kg.), dissolved in water (5 litres), was added to the amsonate suspension during 5 minutes and the mixture was stirred for 2 hours at room temperature. The precipitated amsonic acid was filtered off, washed with distilled water (2 litres) and dried at 85° C.

The filtrate and washings were stirred with charcoal (50 g.) and "Hyflo Supercel" (200 g.) and refiltered. The volume of the colourless filtrate was reduced in vacuo to 2 litres and the resulting concentrated solution was stirred with charcoal (5 g.) and "Hyflo Supercel" (10 g.) and again filtered. The final filtrate was added during 30 minutes to a stirred mixture of acetone (4 litres) and ethanol (4 litres). Stirring was continued for 30 minutes at room temperature and the white crystalline product was filtered, washed with acetone (1 litre) and dried at 35° C. Tetramethylene - 1:4 - bis(diethylmethylammonium hydrogen tartrate) dihydrate (1.129 kg.) was obtained as a colourless crystalline solid, M. P. 201°–205° C. (with decomposition).

I claim:

1. A compound of the general formula:

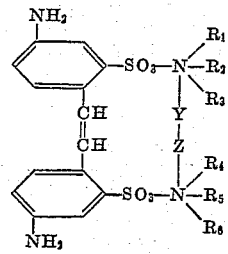

wherein $R_1$ and $R_4$ each represents a lower alkyl group, $R_2$, $R_3$, $R_5$ and $R_6$ when individual groups represent lower alkyl groups and when paired as $R_2$, $R_3$ and $R_5$, $R_6$ respectively form with the adjacent nitrogen atom a monocyclic saturated nitrogenous heterocyclic group that comprises at most six members including a single nitrogen atom, Y represents a member of the class consisting of trimethylene, phenylene and a divalent cyclohexane residue, and Z represents an alkylene chain containing from 1 to 8 carbon atoms.

2. Hexamethylene - 1:6-bis(trimethylammonium)-4:4'-diamino-stilbene-2:2'-disulphonate having the formula:

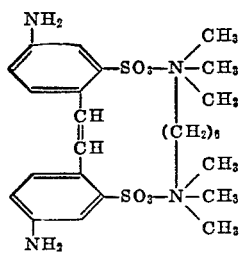

3. Cyclohexylethane - 4:ω-bis(trimethylammonium)-4:4' - diamino - stilbene-2:2' - disulphonate having the formula:

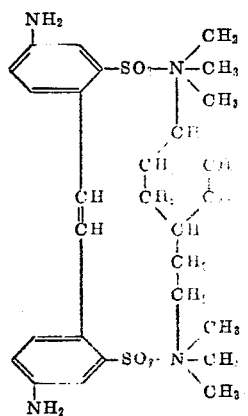

4. Phenylethane - p:ω-bis(trimethylammonium) - 4:4'-diamino-stilbene-2:2'-sulphonate having the formula:

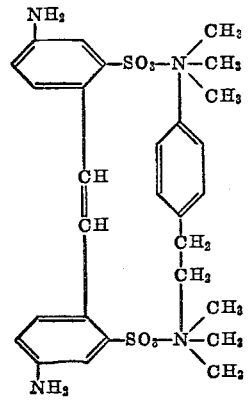

5. Pentamethylene - 1:5-bis(1'-methylpyrrolidinium)-4:4'-diamino-stilbene - 2:2' - disulphonate having the formula:

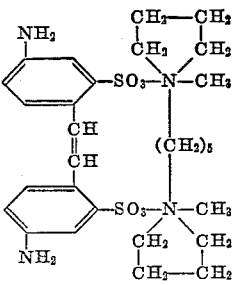

6. Tetramethylene - 1:4-bis(diethylmethylammonium)-4:4' - diamino-stilbene - 2:2' - disulphonate having the formula:

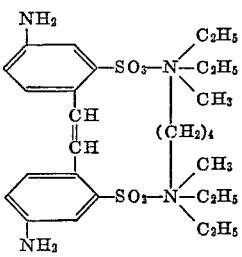

References Cited in the file of this patent
UNITED STATES PATENTS

| | | |
|---|---|---|
| 2,627,491 | Szabo et al. | Feb. 3, 1953 |
| 2,641,610 | Barber | June 9, 1953 |
| 2,661,370 | Barber | Dec. 1, 1953 |
| 2,667,493 | Slack et al. | Jan. 26, 1954 |

FOREIGN PATENTS

| | | |
|---|---|---|
| 467,745 | Canada | Aug. 29, 1950 |